(12) United States Patent
Chen et al.

(10) Patent No.: US 7,970,122 B2
(45) Date of Patent: Jun. 28, 2011

(54) CIRCUIT METHOD AND SYSTEM FOR TRANSMITTING INFORMATION

(75) Inventors: Yakov Chen, Rishon Letzion (IL); Mark Raifel, Ra'anana (IL)

(73) Assignee: AudioCodes Ltd., Lod (IL)

( * ) Notice: Subject to any disclaimer, the term of this patent is extended or adjusted under 35 U.S.C. 154(b) by 1275 days.

(21) Appl. No.: 11/589,755

(22) Filed: Oct. 31, 2006

(65) Prior Publication Data
US 2008/0101593 A1 May 1, 2008

(51) Int. Cl.
*H04M 9/08* (2006.01)

(52) U.S. Cl. .................................. 379/406.01; 370/286

(58) Field of Classification Search ............. 379/406.01; 370/286–292
See application file for complete search history.

(56) References Cited

U.S. PATENT DOCUMENTS

| 6,560,332 B1 * | 5/2003 | Christensson et al. ... 379/406.05 |
| 2004/0001450 A1 * | 1/2004 | He et al. ........................ 370/286 |

* cited by examiner

*Primary Examiner* — Walter F Briney, III
(74) *Attorney, Agent, or Firm* — Eitan Mehulal Law Group

(57) ABSTRACT

Disclosed is a method and circuit for echo suppression or cancellation. According to some embodiments of the present invention, there is provided a circuit including a Noise-Enhanced-Receiving-Direction unit and Narrow-Band Remover unit or units.

20 Claims, 4 Drawing Sheets

CIRCUIT METHOD AND SYSTEM FOR TRANSMITTING INFORMATION

FIELD OF THE INVENTION

The present invention relates generally to communication systems and more particularly to echo cancellers, echo cancellation circuits and echo cancellation methods.

BACKGROUND OF THE INVENTION

Echo in a communication system, is commonly characterized as the return of a part of a transmitted signal from an end user back to the originator of the transmitted signal after a delay period. As is known in the art, a near end user transmits an uplink signal to a far end user. Conversely, the near end user receives a downlink signal from the far end user. For example, echo at the near end occurs when the near end user originates an uplink signal on an uplink path, and a part of the transmitted signal is reflected at the far end as an echo signal on a downlink path back to the near end. Echo at the far end occurs when the far end user originates a downlink signal on the downlink path, and a part of the transmitted signal is reflected at the near end as an echo signal on the uplink path back to the far end. The reflection of the transmitted signal may occur due to a number of reasons, such as an impedance mismatch in a four/two wire hybrid at the far end or feedback due to acoustic coupling in a telephone, wireless device or hands-free speaker phone. An echo signal corresponding to the delayed transmitted signal is perceived as annoying to the near end user and, in some cases, can result in an unstable condition known as "howling."

Echo cancellers are desirable at any echo generating source at both the near end and at the far end in an attempt to eliminate or reduce the transmission of echo signals. Echo cancellers may be employed in wireless devices, such as personal data assistants (PDAs), cellular phones, two-way radios, car-kits for cellular telephones, car phones and other suitable devices that can move throughout a geographic area Additionally, echo cancellers may be employed in wireline devices, such as hands-free speaker phones, video and audio conference phones, data and fax modems, and telephones otherwise commonly referred to in the telecommunications industry as plain old telephone system (POTS) devices. Except consumer devices, echo cancellers may be employed in infrastructure devices (e.g. gateways) of communication networks like voice over packet networks and satellite networks. Hands-free speaker phones typically include a microphone to produce the uplink signal, a speaker to acoustically produce the downlink signal, an echo canceller to cancel the echo signal and a telephone circuit.

Turning now to FIG. 1, there is shown an exemplary Echo Canceller (EC) circuit. Wherein, the original signal sent from the far-end is denoted by Rin (100). Rout (120) is the post-processed signal by the Echo-Canceller-Receiving-Direction (EC-RD) (110) unit After the signal Rout is received at the near-end, a signal Sin (130) is transmitted from the near-end. The signal Sin consists of a superposition of the (1) echo of Rout that is reflected back from near-end echo sources and (2) near-end talker signal. Echo-Canceller-Sending-Direction (EC-SD) (140) receives two signals, as shown in FIG. 1, the first input signal is Rout and the second input signal is Sin. EC-SD removes the echo replica of Rout from Sin, as a result, the generated output of the EC-SD, denoted by Sout (150), is a residual signal without echo.

The performance of EC's decreases when transmitting Narrow-Band signals. Narrow-Band signals may cause the EC to adapt in such a way that will worsen its performance during subsequent transmission.

The majority of EC's disable their adaptation process during transmission of Narrow-Band signals. This action may result in severe errors, which may lead to undesirable outcomes. An example of such outcome happens during the process of "handshake" in a telephone-call or fax-call. If the adaptation process is disabled during the handshake it is likely that the handshake will not succeed.

An alternative action would be to allow the EC to adapt to the Narrow-Band signal, however the cost would be of poor performance during subsequent signals due to the fact that it is difficult and time consuming to re-adapt EC if it is already diverged due to a Narrow-Band signal.

There is a need in the field of communication for improved methods and circuits for echo cancellation during successful transmission of narrow-band signals without worsening transmission of any other type of signals.

SUMMARY OF THE INVENTION

According to some embodiments of the present invention, there is provided an echo suppresser or cancellation circuit including a Noise-Enhanced-Echo-Canceller-Receiving-Direction (NE-EC-RD). The Noise-Enhanced-Echo-Canceller-Receiving-Direction unit may add to the received far-end signal ($R_{in}$) Enhancer-Noise (EN) signal.

According to some embodiments of the present invention, Enhancer-Noise (EN) signal is a signal that when added to the received far-end signal ($R_{in}$) will enhance the adaptation capability of the EC while transmitting Narrow-Band signal, an example of such EN signal is a White-Noise (WN) signal.

According to some further embodiments of the present invention, the addition of EN may be done in accordance with a known signal to noise ratio (SNR) according to the needs of the application.

According to some embodiments of the present invention, the adaptation performance of the EC reaches it's peak when the far-end signal ($R_{in}$) is a white-noise (WN) signal. This happens due to the fact that WN is an all-band signal and exists in all frequencies with equal power amplitude, accordingly the EC adapts to all subsequent Wide-Band and Narrow-Band signals. According to some further embodiments of the present invention, WN may be the optimal EN signal, however, other signals may be used as EN while using the proposed method of this invention.

According to some embodiments of the present invention, the output signal of the NE-EC-RD is denoted by $R_{out}$. It should be clear to one of ordinary skills in the art that the addition of EN does not suppress any information needed by the near-end.

According to some embodiments of the present invention, the EC may include a Narrow-Band-Remover (NBR). According to yet further embodiments of the present invention, the NBR may process the output of the NE-EC-RD ($R_{out}$). As a result, a pure EN signal, denoted by $R'_{out}$, is generated.

According to some further embodiments of the present invention, the signal $S_{in}$, which signal is received from the near-end ($S_{in}$ may include a superposition of (1) echo of $R_{out}$ and (2) near-end talker signal), may also be processed by an NBR. This generates a signal, denoted by $S'_{in}$, which is the superposition of the echo of pure EN and near-end talker signal.

According to some embodiments of the present invention, the EC may include an EC-SD as explained hereinabove. According to yet further embodiments of the present invention, the input signals of the EC-SD may be $R'_{out}$ and $S'_{in}$. According to yet further embodiments of the present invention, the signals R'out and S'in are free of Narrow-Band signals, accordingly we let the EC to adapt itself with EN and echo of EN signals.

According to some embodiments of the present invention, the EC-SD extracts the echo-replica of R'out from S'in. According to further embodiments of the present invention, the output signal of the EC-SD, denoted by Sout, is free of Narrow-Band echo and of Enhancer-Noise echo.

According to some embodiments of the present invention, while EC-SD extracts the echo-replica of R'out from S'in, EC-SD adapts itself with EN and echo of EN. In this way, (1) the adaptation of EC will be improved and (2) the degradation in the performance of EC, due to the transmission of current narrow-band signal, would be decreased during the subsequent narrow-band and wide-band signals.

According to some embodiments of the present invention, when using WN as EN and while EC-SD extracts the echo-replica of R'out from S'in, EC-SD adapts itself with WN and echo of WN. In this way, (1) the adaptation of EC will reach its peak and (2) the degradation of the performance of EC, due to the transmission of current narrow-band signal, would not occur during the subsequent narrow-band and wide-band signals.

According to some embodiments of the present invention, the EC may include a circuit for detecting Narrow-Band signals or may get this information from an outer auxiliary source.

According to some embodiments of the present invention, the EC may include one or more control circuits that may control the operation of NE-EC-RD and the two NBRs. These circuits may decide whether to enable and/or disable the operation of NE-EC-RD and/or the two NBRs in accordance with (1) the state of the EC and (2) the type of the transmitted signal.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which.

Figure 1:
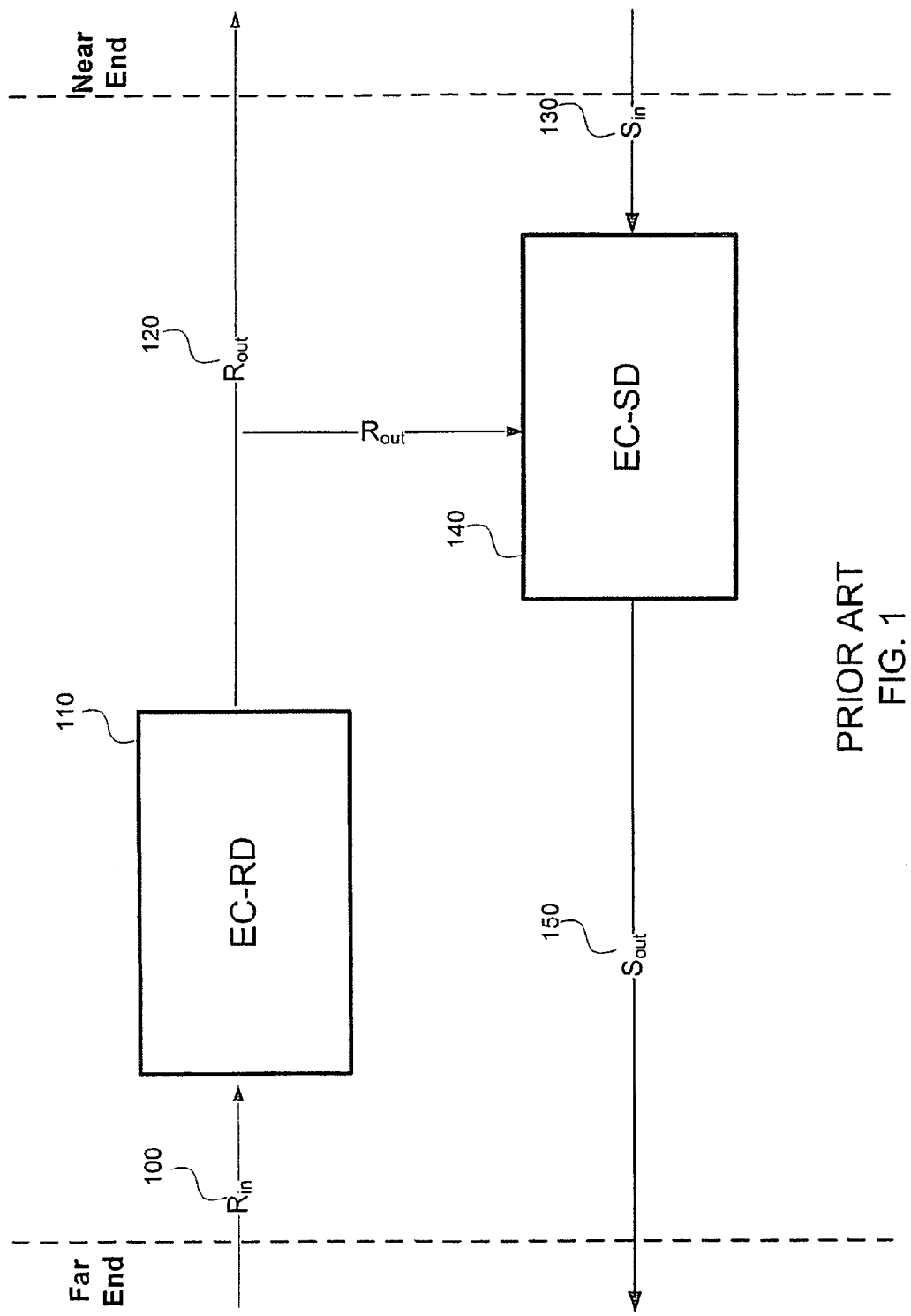
FIG. 1 shows an exemplary block-diagram of an Echo-Canceller, according to the prior art.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein. One of ordinary skill in the art should understand that the described invention may be used for all kinds of wireless or wire-line system According to some embodiments of the present invention, there is provided an echo suppresser or cancellation circuit including a Noise-Enhanced-Echo-Canceller-Receiving-Direction (NE-EC-RD). The Noise-Enhanced-Echo-Canceller-Receiving-Direction unit may add to the received far-end signal ($R_{in}$) Enhancer-Noise (EN) signal.

According to some embodiments of the present invention, Enhancer-Noise (EN) signal is a signal that when added to the received far-end signal ($R_{in}$) will enhance the adaptation capability of the EC while transmitting Narrow-Band signal, an example of such EN signal is a White-Noise (WN) signal.

According to some further embodiments of the present invention, the addition of EN may be done in accordance with a known signal to noise ratio (SNR) according to the needs of the application.

According to some embodiments of the present invention, the adaptation performance of the EC reaches it's peak when the far-end signal ($R_{in}$) is a white-noise (WN) signal. This happens due to the fact that WN is an all-band signal and exists in all frequencies with equal power amplitude, accordingly the EC adapts to all subsequent Wide-Band and Narrow-Band signals. According to some further embodiments of the present invention, WN may be the optimal EN signal, however, other signals may be used as EN while using the proposed method of this invention According to some embodiments of the present invention, the output signal of the NE-EC-RD is denoted by $R_{out}$. It should be clear to one of ordinary skills in the art that the addition of EN does not suppress any information needed by the near-end.

According to some embodiments of the present invention, the EC may include a Narrow-Band-Remover (NBR), According to yet further embodiments of the present invention, the NBR may process the output of the NE-EC-RD ($R_{out}$). As a result, a pure EN signal, denoted by $R'_{out}$, is generated.

According to some further embodiments of the present invention, the signal $S_{in}$, which signal is received from the near-end ($S_{in}$ may include a superposition of (1) echo of $R_{out}$ and (2) near-end talker signal), may also be processed by an NBR. This generates a signal, denoted by $S'_{in}$, which is the superposition of the echo of pure EN and near-end talker signal.

According to some embodiments of the present invention, the EC may include an EC-SD as explained hereinabove. According to yet further embodiments of the present invention, the input signals of the EC-SD may be $R'_{out}$ and $S'_{in}$. According to yet further embodiments of the present invention, the signals R'out and S'in are free of Narrow-Band signals, accordingly we let the EC to adapt itself with EN and echo of EN signals.

According to some embodiments of the present invention, the EC-SD extracts the echo-replica of R'out from S'in. According to further embodiments of the present invention, the output signal of the EC-SD, denoted by Sout, is free of Narrow-Band echo and of Enhancer-Noise echo.

According to some embodiments of the present invention, while EC-SD extracts the echo-replica of R'out from S'in, EC-SD adapts itself with EN and echo of EN. In this way, (1) the adaptation of EC will be improved and (2) the degradation in the performance of EC, due to the transmission of current narrow-band signal, would be decreased during the subsequent narrow-band and wide-band signals.

According to some embodiments of the present invention, when using WN as EN and while EC-SD extracts the echo-replica of R'out from S'in, EC-SD adapts itself with WN and echo of WN. In this way, (1) the adaptation of EC will reach its peak and (2) the degradation of the performance of EC, due to the transmission of current narrow-band signal, would not occur during the subsequent narrow-band and wide-band signals.

According to some embodiments of the present invention, the EC may include a circuit for detecting Narrow-Band signals or may get this information from an outer auxiliary source.

According to some embodiments of the present invention, the EC may include one or more control circuits that may control the operation of NE-EC-RD and the two NBRs. These circuits may decide whether to enable and/or disable the operation of NE-EC-RD and/or the two NBRs in accordance with (1) the state of the EC and (2) the type of the transmitted signal.

Figure 2:
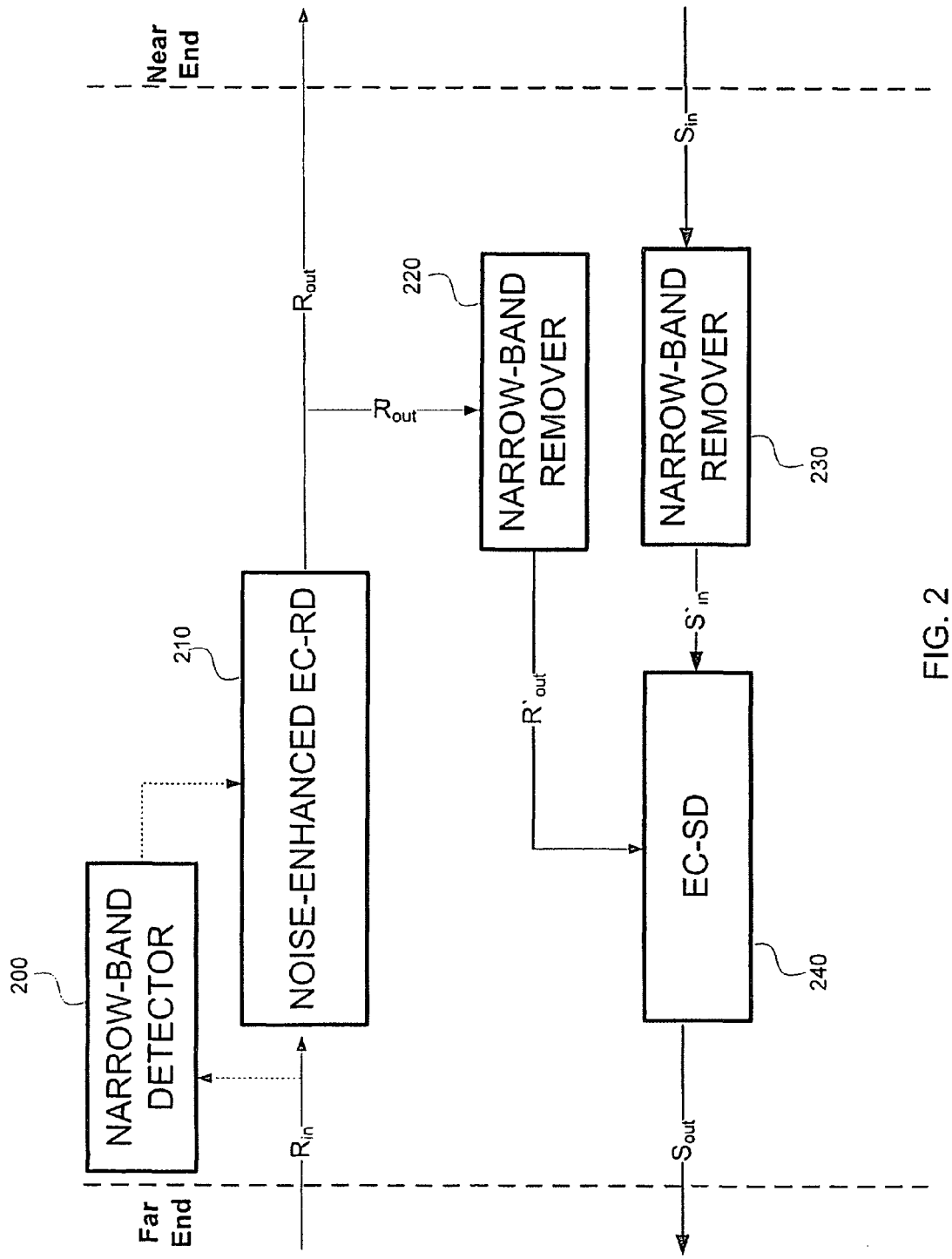
FIG. 2 shows an exemplary block-diagram of an Echo-Canceller, according to some embodiments of the present invention.

Turning now to FIG. 2, there is shown a block diagram of an Echo Canceller according to some embodiments of the present invention. The Echo-Canceller may include a Narrow Band Detection (NBD) unit (200), an NE-EC-RD unit (210), one or more Narrow-Band-Removers unit (220 and 230) and an EC-SD unit (240), which unit receives two input signals and may extract the echo replica of one from the other. The operation of the Echo Cancellation of FIG. 2 may be described in conjunction with the steps of the flow chart shown in FIG. 3, which flowchart includes the steps of a method of Echo Cancellation according to some embodiments of the present invention.

According to some embodiments of the present invention, in the event that the NBD unit 200 determines that the far-end signal, denoted by Rin, is a Narrow-Band signal, (FIG. 3, step 3000), the NBD may produce a signal indicating one or more parameters of the received signal. The parameters provided may include desired SNR, Band-Width of the received signal etc. Any circuits or methodology for narrow-band detection, known today or to be devised in the future may be applicable to the present invention.

Figure 3:
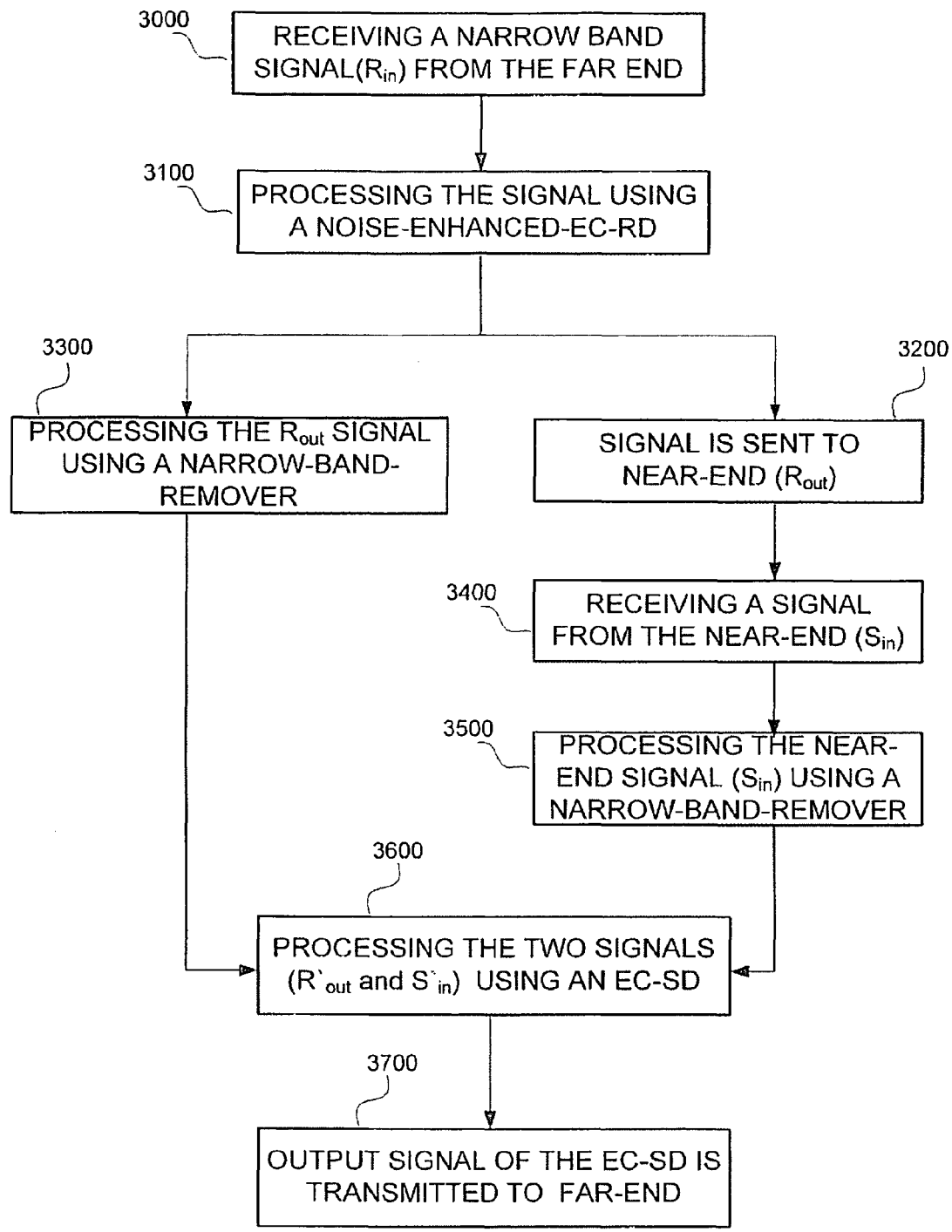
FIG. 3 is a flowchart including the steps of a method of echo suppression and/or cancellation according to some embodiments of the present invention.

According to some embodiments of the present invention, the NE-EC-RD (210) may process Rin (FIG. 3 step 3100). According to further embodiments of the present invention, unit 210 may add Enhancer-Noise to the signal where the added EN may have a specific SNR value.

According to yet further embodiments of the present invention, the SNR value may be determined by the EC-RD unit and/or by an auxiliary control circuit.

According to some embodiments of the present invention, the output signal of the NE-EC-RD, denoted by Rout, is sent to the near-end (FIG. 3 step 3200).

According to further embodiments of the present invention, a signal is received from the near-end (FIG. 3 step 3400), which signal is denoted by Sin, as explained hereinabove, the signal may include superposition of (1) echo-replica of Rout and (2) near-end talker signal.

According to some embodiments of the present invention, Sin may be processed using a Narrow-Band-Remover 230 (FIG. 3 step 3500). Any circuits or methodology for Narrow-Band Removal, known today or to be devised in the future may be applicable to the present invention. According to yet further embodiments of the present invention, the signal generated by the Narrow-Band-Remover 230 is denoted by S'in, which signal may be an all-band signal.

According to further embodiments of the present invention, Rout may be processed using a Narrow-Band-Remover 220 (FIG. 3 step 3300). Any circuits or methodology for Narrow-Band Removal, known today or to be devised in the future, may be applicable to the present invention. According to yet further embodiments of the present invention, the signal generated by the Narrow-Band-Remover 220 is denoted by R'out, which signal may be an all-band signal.

According to some embodiments of the present invention, the EC-SD unit 240, may receive as input the signals R'out and S'in. According to yet further embodiments of the present invention, the 240 unit may process it's input signals (FIG. 3 step 3600), which process may include extracting the echo-replica of R'out from S'in.

According to further embodiments of the present invention, the output signal of unit 240, denoted by Sout, is transmitted to the far-end (FIG. 3 step 3700), According to some further embodiments of the present invention, due to the process of unit 240, as explained hereinabove, Sout may be free of (1) Narrow-Band echo and (2) Enhancer-Noise echo.

According to some embodiments of the present invention, while unit 240 extracts the echo-replica of R'out from S'in, unit 240 may also adapt EC with EN and echo of EN. In this way, (1) the adaptation of EC may be improved and (2) the degradation in the performance of EC, due to the transmission of current narrow-band signal, may be decreased during the subsequent narrow-band and wide-band signals.

According to some embodiments of the present invention, any signal that can improve the performance of EC adaptation and the transmission of the Narrow-Band signal may be used as Enhancer-Noise signal.

According to some further embodiments of the present invention, the EC adaptation (which occurs while unit 240 processes its input signals) is best performed when the input signals of unit 240 are (1) White-Noise signal and the (2) echo of the White-Noise signal. Therefore, in accordance with some embodiments of the present invention, the EC adaptation may be best performed when White-Nose signal is used as an Enhancer-Noise signal by unit 210.

According to some embodiments of the present invention, when unit 210 uses WN as EN and while unit 240 processes the echo-replica of R'out from S'in, unit 240 also adapts EC with WN and echo of WN, this results in that (1) the adaptation of EC will reach its peak and in that (2) the phenomenon of degradation in the performance of EC due to the transmission of current narrow-band signal, will not occur in the subsequent narrow-band and wide-band signals.

According to some embodiments of the present invention, any circuits or methodology of echo cancellation, known today or to be devised in the future, may be applicable to the present invention in the implementation of unit 240.

According to some embodiments of the present invention, the EC may include control circuits that control the operation of units 210, 220 and 230. The operation of these circuits may include the decision of enable and disable the operation of units 210, 220 and 230 according to the state of the EC and the type of the signal that is transmitted.

Figure 4A:
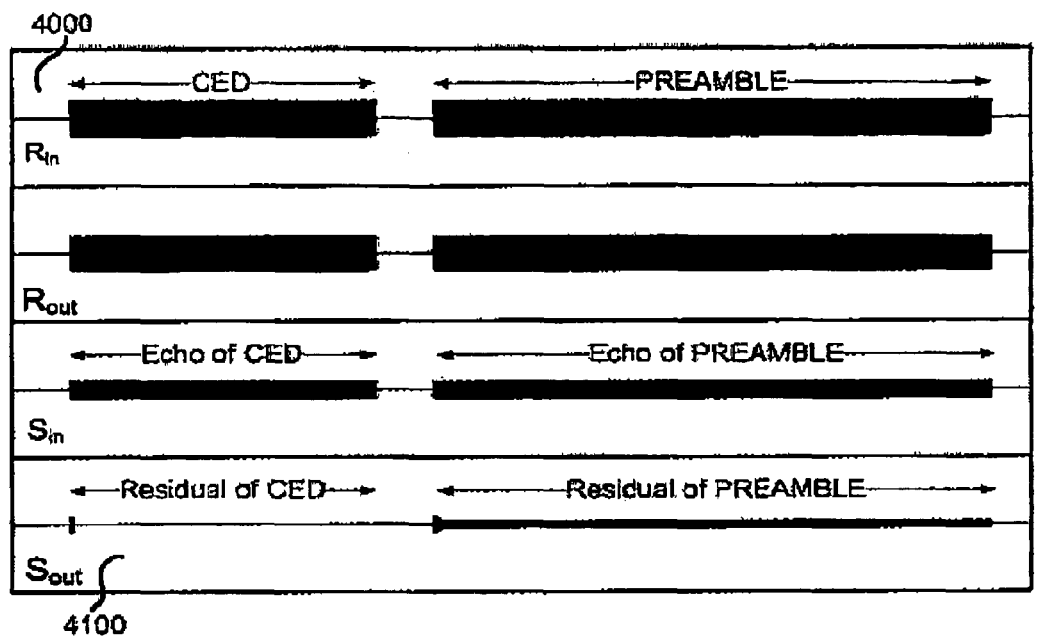
FIGS. 4A and 4B shows a set of signal graphs illustrating signal processing according to some aspects of the present invention.
Figure 4B:
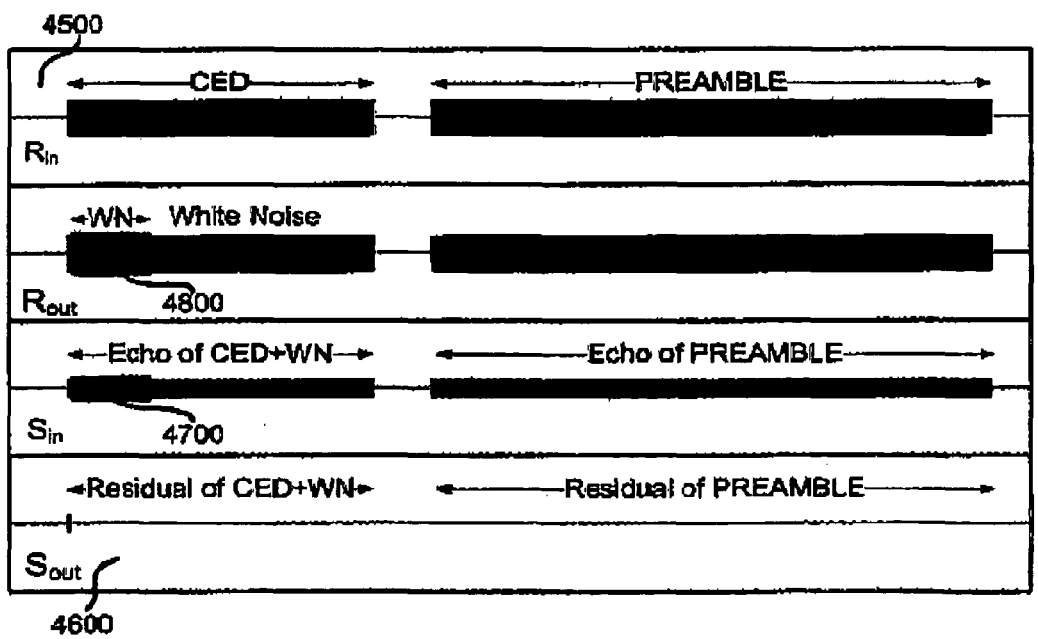

Turning now to FIGS. 4A and 4B, there is shown a set of signal graphs illustrating signal processing according to some aspects of the present invention. The signals depicted in FIGS. 4A and 4B are taken from a test of the Digital Network Echo Cancellers Standard G.168/2002. The input signal (4000 4500) in the test is a 2100 Hz single tone Narrow-Band signal, followed by a preamble sequence.

FIG. 4A depicts the signals of FIG. 1 without the use of the NE-EC-RD and the NBD's. As seen from $S_{out}$ (4100), EC converged (adapted) to the Narrow-Band signal, which adaptation lead to that the echo of the preamble signal could not be totally cancelled, FIG. 4B depicts the signals on the same test as FIG. 4A, this time by using an EC similar to the one shown in FIG. 2 and according to some further embodiments of the present invention. As a Narrow-Band-Remover unit (220 and 230) an adaptive notch filter was used, and as Enhancer-Noise White-Noise signal is used. According to some further embodiments of the present invention the addition of WN is shown clearly in the Figure (4700 and 4800).

According to some further embodiments of the present invention, one of ordinary skills in the art can see that Sout (4600) signal is free from any echo (WN and near-end talker) both in the (1) CED and in the (2) preamble.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. An echo suppresser apparatus comprising:
    a noise-enhanced receive-direction echo-canceller to receive a far-end signal (Rin) and to introduce into it an enhancer noise signal;
    a narrowband detector to receive said far-end signal (Rin);
    a first narrowband remover;
    a second narrowband remover; and
    a send-direction echo-canceller;
    wherein the narrowband detector is (a) to determine whether or not the received far-end signal (Rin) comprises a narrowband signal; and (b) if the received far-end signal (Rin) comprises said narrowband signal, to provide to the noise-enhanced receive-direction echo-canceller an intermediate signal indicating one or more parameters of the received far-end signal (Rin);
    wherein, based on said input received by the noise-enhanced receive-direction echo-canceller, the noise-enhanced receive-direction echo-canceller is (i) to process the received far-end signal (Rin), and (ii) to produce a processed signal (Rout);
    wherein the processed signal (Rout) is transferred to the first narrowband remover, and wherein the first narrowband remover is to perform narrowband removal and to generate a first all-band signal (R'out);
    wherein the processed signal (Rout) is also sent to a near-end;
    wherein the second narrowband remover is to receive a near-end signal (Sin), to perform narrowband removal and to generate a second all-band signal (S'in);
    wherein the send-direction echo-canceller is to receive as inputs the first all-band signal (R'out) and the second all-band signal (S'in).

2. The echo suppresser apparatus according to claim 1, wherein the first narrowband remover is adapted to remove narrowband signal components from the received far-end signal (Rin) after said enhancer noise signal is introduced into the received far-end signal (Rin).

3. The echo suppresser apparatus according to claim 1, wherein said enhancer noise signal comprises:
    a signal that when added to the received far-end signal (Rin) enhances an adaptation capability of the send-direction echo-canceller while transmitting a narrowband signal.

4. The echo suppresser apparatus according to claim 1, wherein the enhancer-noise signal is introduced in accordance with a specific Signal to Noise Ratio (SNR).

5. The echo suppresser apparatus according to claim 1, wherein said enhancer noise signal comprises a white noise signal.

6. The echo suppresser apparatus according to claim 1,
    wherein the first all-band signal (R'out) is free of narrowband components;
    wherein the second all-band signal (S'in) is free of narrowband components;
    wherein the method comprises adapting the send-direction echo-canceller by utilizing the enhancer noise signal and an echo of the enhancer noise signal.

7. The echo suppresser apparatus according to claim 1, wherein the one or more parameters are selected from the group consisting of:
    Signal to Noise Ratio (SNR) of the received far-end signal (Rin);
    bandwidth of the received far-end signal (Rin).

8. The echo suppresser apparatus according to claim 1, wherein the send-direction echo-canceller is to process an echo-replica of the first all-band signal (R'out) from the second all-band signal (S'in).

9. The echo suppresser apparatus according to claim 8, wherein the send-direction echo-canceller is to adapt itself by utilizing the enhancer noise signal and an echo of the enhancer noise signal, (a) while the noise-enhanced receive-direction echo-canceller utilizes white noise as the enhancer signal, and (b) while the send-direction echo-canceller processes the echo-replica of the first all-band signal (R'out) from the second all-band signal (S'in).

10. The echo suppresser apparatus according to claim 1, further comprising:
one or more control circuit to determine whether to enable or disable the operation of one or more of: (a) the noise-enhanced receive-direction echo-canceller, (b) the first narrowband remover, and (c) the second narrowband remover,
based on one or more of: (i) a state of the echo suppresser apparatus, and (ii) a type of signal being transmitted.

11. The echo suppresser apparatus according to claim 1, wherein output of the send-direction echo-canceller is transmitted to a far-end.

12. A method of echo suppression, the method comprising:
receiving a far-end signal (Rin);
introducing an enhancer noise signal into the received far-end signal (Rin);
determining whether or not the received far-end signal (Rin) comprises a narrowband signal;
if the received far-end signal (Rin) comprises said narrowband signal, then, providing to a noise-enhanced receive-direction echo-canceller an intermediate signal indicating one or more parameters of the received far-end signal (Rin);
at the noise-enhanced receive-direction echo-canceller, processing the received far-end signal (Rin) and producing a processed signal (Rout);
transferring the processed signal (Rout) to a first narrowband remover;
at the first narrowband remover, performing narrowband removal and generating a first all-band signal (R'out);
sending the processed signal (Rout) to a near-end;
at a second narrowband remover, receiving a near-end signal (Sin), performing narrowband removal, and generating a second all-band signal (S'in);
at a send-direction echo-canceller, receiving as inputs the first all-band signal (R'out) and the second all-band signal (S'in).

13. The method according to claim 12, comprising:
removing narrowband signal components from the received far-end signal (Rin)
after the enhancer noise signal is introduced into the received far-end signal (Rin).

14. The method according to claim 12, wherein said enhancer noise signal comprises:
a signal that when added to the received far-end signal (Rin) enhances an adaptation capability of the send-direction echo-canceller while transmitting a narrowband signal.

15. The method according to claim 12, wherein introducing the Enhancer-Noise signal is operated in accordance with a known Signal to Noise Ratio (SNR).

16. The method according to claim 12, wherein said enhancer noise signal comprises a white noise signal.

17. The method according to claim 12,
wherein the first all-band signal (R'out) is free of narrowband components;
wherein the second all-band signal (S'in) is free of narrowband components;
wherein the send-direction echo-canceller, which receives as inputs the first all-band signal (R'out) and the second all-band signal (S'in), is to adapt itself by utilizing the enhancer noise signal and an echo of the enhancer noise signal.

18. The method according to claim 12, wherein the one or more parameters are selected from the group consisting of:
Signal to Noise Ratio (SNR) of the received far-end signal (Rin);
bandwidth of the received far-end signal (Rin).

19. The method according to claim 12, comprising:
processing, by the send-direction echo-canceller, an echo-replica of the first all-band signal (R'out) from the second all-band signal (S'in).

20. The method according to claim 12, comprising:
transmitting an output of the send-direction echo-canceller to a far-end.

* * * * *